United States Patent
Von Neubeck et al.

(10) Patent No.: US 11,238,581 B2
(45) Date of Patent: Feb. 1, 2022

(54) METHOD, SYSTEM AND COMPUTER PROGRAM FOR COMPUTER-ASSISTED EVALUATION OF BIOMARKERS IN A TISSUE SAMPLE

(71) Applicants: Deutsches Krebsforschungszentrum Stiftung des öffentlichen Rechts, Heidelberg (DE); Brandenburgische Technische Universität Cottbus-Senftenberg, Cottbus-Senftenberg (DE); GA Generic Assays GmbH, Dahlewitz/Berlin (DE)

(72) Inventors: Cläre Von Neubeck, Heidelberg (DE); Rico Hiemann, Cottbus-Senftenberg (DE); Alexey Elimport, Dahlewitz/Berlin (DE)

(73) Assignees: Deutsches Krebsforschungszentrum Stiftung des öffentlichen Rechts, Heidelberg (DE); Brandenburgische Technische Universität Cottbus-Senftenberg, Cottbus-Senftenberg (DE); GA Generic Assays GmbH, Dahlewitz/Berlin (DE)

( * ) Notice: Subject to any disclaimer, the term of this patent is extended or adjusted under 35 U.S.C. 154(b) by 71 days.

(21) Appl. No.: 16/649,362

(22) PCT Filed: Sep. 19, 2018

(86) PCT No.: PCT/EP2018/075314
§ 371 (c)(1),
(2) Date: Mar. 20, 2020

(87) PCT Pub. No.: WO2019/057750
PCT Pub. Date: Mar. 28, 2019

(65) Prior Publication Data
US 2020/0273161 A1    Aug. 27, 2020

(30) Foreign Application Priority Data

Sep. 20, 2017   (EP) .................................. 17192123.2
Feb. 2, 2018    (EP) .................................. 18154858.7

(51) Int. Cl.
*G06T 7/00*      (2017.01)
*G06T 7/194*     (2017.01)
(Continued)

(52) U.S. Cl.
CPC .............. *G06T 7/0012* (2013.01); *G06T 7/11* (2017.01); *G06T 7/143* (2017.01); *G06T 7/174* (2017.01);
(Continued)

(58) Field of Classification Search
None
See application file for complete search history.

(56) References Cited

U.S. PATENT DOCUMENTS 9,725,766 B1 *   8/2017   Potts ................ G01N 33/56972
2008/0166035 A1 * 7/2008  Qian ..................... G06T 7/0012
                                                            382/133
(Continued)

OTHER PUBLICATIONS

International Searching Authority/EPO, International Search Report and Written Opinion of the International Searching Authority, Application No. PCT/EP2018/075314, dated Jan. 2, 2019, 15 pages.
(Continued)

*Primary Examiner* — Vu Le
*Assistant Examiner* — Courtney Joan Nelson
(74) *Attorney, Agent, or Firm* — Sunstein LLP

(57) ABSTRACT

Disclosed are a method for computer-assisted evaluation of biomarkers in a tissue sample as well as a corresponding system and computer program. The method includes the following steps: providing an image of the tissue sample in which cell nuclei of the tissue as well as biomarkers are
(Continued)

represented, automatically determining for a plurality of locations or regions within the image a blood vessel probability that represents a probability that the image at the corresponding location or region represents a blood vessel, automatically determining an assumed blood vessel location within the image based on a distribution of blood vessel probability with respect to the locations or regions within the image, automatically selecting biomarkers represented in the image at locations outside the assumed blood vessel location but within a threshold distance from the assumed blood vessel location, and automatically evaluating the selected biomarkers.

22 Claims, 6 Drawing Sheets

(51) Int. Cl.
  *G06T 7/143* (2017.01)
  *G06T 7/11* (2017.01)
  *G06T 7/174* (2017.01)

(52) U.S. Cl.
  CPC .... *G06T 7/194* (2017.01); *G06T 2207/10056* (2013.01); *G06T 2207/10064* (2013.01); *G06T 2207/20012* (2013.01); *G06T 2207/20076* (2013.01); *G06T 2207/20182* (2013.01); *G06T 2207/20221* (2013.01); *G06T 2207/30024* (2013.01); *G06T 2207/30096* (2013.01); *G06T 2207/30101* (2013.01)

(56) References Cited

U.S. PATENT DOCUMENTS

2014/0003702 A1* 1/2014 McCulloch ........... G06T 7/0012
  382/134
2017/0109880 A1* 4/2017 Al-Kofahi ............... G06T 7/143

OTHER PUBLICATIONS

Annika Willitzki et al., *Fully automated analysis of chemically induced γH2AX foci in human peripheral blood mononuclear cells by indirect immunofluorescence*, Cytometry Part A, vol. 83, No. 11, Sep. 5, 2013, pp. 1017-1026.

* cited by examiner c)

d)

e)

f)

g)

a)

b)

c)

d)

e)

f)

g)

c)

d)

e)

f)

g)

METHOD, SYSTEM AND COMPUTER PROGRAM FOR COMPUTER-ASSISTED EVALUATION OF BIOMARKERS IN A TISSUE SAMPLE

CROSS-REFERENCE TO RELATED APPLICATIONS

This application is the national phase entry of International Patent Application No. PCT/EP2018/075314 filed on Sep. 19, 2018, and claims the benefit of EP Patent Application No. 17192123.2 filed Sep. 20, 2017 and EP Patent Application No. 18154858.7 filed Feb. 2, 2018, the disclosures of which are incorporated herein by reference in their entirety.

FIELD OF THE INVENTION

The present invention is in the field of biotechnology and biomedicine. In particular, the present invention relates to a method for computer-assisted evaluation of biomarkers in a tissue sample accounting for the perfusion state of the associated tissue, as well as a corresponding system and computer program product.

BACKGROUND OF THE INVENTION

It has been found that in a meaningful evaluation of biomarkers, the oxygenation of the respective tissue can be of critical importance. For example, in Menegakis et al., *Residual DNA double-strand breaks in perfused but not in unperfused areas determine different radiosensitivity of tumors*, Radiotherapy and Oncology 100 (2011) 137-144, it was shown that while the biomarker γH2AX can be generally used for detecting residual DNA damage after radiation, and thereby be of use for predicting radiation treatment response, the dose-response of residual γH2AX foci is highly dependent on tumor cell oxygenation in well perfused areas. It was shown that only a γH2AX evaluation in perfused tumor areas could distinguish between the different radio sensitivities of two different tumor models. Accordingly, for these types of bio assays, it is mandatory that the evaluation of biomarkers is restricted to regions of the tumor tissue that is sufficiently perfused.

One possibility to restrict evaluation of biomarkers to sufficiently perfused areas in such a scenario would be to inject markers such as Pimondiazole, which indicates a lack of oxygenation, and BrdU, which indicates proliferating, vital cells, to test animals about one hour prior to irradiation. In order to examine the dose-response, tumors may be resected at predetermined times after the irradiation, fixed in formalin, and embedded in paraffin. Two consecutive sections can be provided. In the first section, the injected markers can be stained by means of immunohistochemistry techniques and scanned using a color camera. In the thus obtained first image, functional blood vessels can be revealed by the presence of BrdU and the absence of Pimondiazole, thereby allowing to identify perfused regions of the tumor tissue. In the second section, the biomarker (in this example γH2AX) and the DNA are stained using immunofluorescence, and respective fluorescence images are taken at positions close to the functional vessels determined from the first section as described above and combined in a joined image, showing both, the DNA and the biomarker foci. In this joined image, the biomarker foci may be evaluated in regions that are determined to be sufficiently perfused based on the image of the first section.

While in principle, the evaluation of selected biomarkers within regions exhibiting sufficient perfusion can be carried out, the procedure is quite labor intensive and leads to reproducibly problems in the achieved results.

SUMMARY OF THE INVENTION

The problem underlying the invention is to provide a method for the evaluation of biomarkers in a tissue sample accounting for the perfusion state, which is simple to carry out and leads to reproducible results.

This problem is solved by a method for computer-assisted evaluation of biomarkers in a tissue sample according to claim 1, a computer readable storage medium according to claim 14 and a system according to claim 15. Preferable embodiments are defined in the dependent claims.

The method of the invention comprises a step of providing an image of the tissue sample in which cell nuclei of the tissue as well as biomarkers are represented. Herein, the term "represented" could e.g. mean that the nuclei and biomarkers are "visible". Note, however, that in general, the image is simply a set of image sensor readings of a camera or the like, which need not be processed in a way such as to be visible to a human being. It is further emphasized that the "image" as referred to herein could designate a combined image representing both, the nuclei and the biomarkers, but could also designate a set of co-registered images, one representing the biomarkers and one representing the nuclei.

The method of the invention further comprises a step of automatically determining for a plurality of locations or regions within the image a blood vessel probability that represents a probability that the image at the corresponding location or region represents a blood vessel. The automatic determining is based on a combination of at least two blood vessel probability indicators, wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location a region, and wherein said automatic determining is based on an algorithms that calculates said blood vessel probability based on said at least two blood vessel probability indicators.

The method further comprises the steps of automatically determining an assumed blood vessel location within said image based on a distribution of blood vessel probability with respect to said locations or regions within the image, automatically selecting biomarkers represented in said image at locations outside the assumed blood vessel location but within a threshold distance from said assumed blood vessel location, and automatically evaluating the selected biomarkers. By restricting the evaluation of the biomarkers to a region of the tissue sufficiently close to the (assumed) blood vessel location, it can be expected that the perfusion in this region is sufficient.

In the method of the invention, the image may be composed of a plurality of image cells, and some or all of the image cells may correspond to said regions of said image. In other embodiments, the image may be composed of a plurality of pixels, and some or all of the pixels correspond to said locations within said image. Irrespectively of precisely how the regions or locations within the image are defined, the method of the invention employs a probabilistic approach, where a blood vessel probability is automatically determined that represents a probability that the image at the corresponding location or region represents a blood vessel. Since this blood vessel probability is defined for a plurality of locations or regions, for example (but not necessarily) for each pixel of the image, a blood vessel probability distribution among the image is thereby defined. Based on such blood vessel probability distribution, an "assumed blood vessel location" can then be determined. For example, locations or regions having blood vessel probabilities exceeding a predetermined threshold value may be assigned to the assumed blood vessel location. Herein the term "assumed" again indicates that the blood vessel location is determined in a probabilistic approach.

Moreover, according to the present invention, the blood vessel probability itself is determined based on a combination of at least two, but possibly more blood vessel probability indicators. The rationale behind this approach is that in absence of any hard criterion by which a blood vessel at a given location can be a identified by a computer with certainty, by combining at least two, but possibly more "blood vessel probability indicators", a reliable estimate of the blood vessel probability can be obtained. Generally, there are no limitations as to what the "blood vessel probability indicators" may be. However, according to the invention, at least one of the blood vessel probability indicators is based on an automatic assessment of at least one of the nucleus properties referred to above. As will be apparent from the detailed description below, each of these nucleus properties has the potential of indicating whether it is likely that a blood vessel is present at the corresponding location or region. By combining several of these nucleus properties in the calculation of the blood vessel probability, the reliability of the blood vessel probability can be improved.

In a preferred embodiment, the nucleus property is the shape of said nucleus, and said automatic assessment of the nucleus shape comprises distinguishing between nuclei of round shape and nuclei of elongate or "elongated" shape. Herein said algorithm accounts for the presence of round or elongate shapes of nuclei in the determining of the blood vessel probability in such a manner, that the presence of round nuclei shapes leads to a lower blood vessel probability and the presence of elongate nuclei shapes leads to a higher blood vessel probability. This criterion is based on the observation that endothelial cells as found in blood vessels typically have elongate nuclei, such that a preponderance of elongate nuclei is indeed an indication of a blood vessel to be present.

The distinguishing between nuclei of round shape and nuclei of an elongate shape may comprise determining, in the image of the tissue sample, a maximum diameter and a minimum diameter of the respective nucleus, or a maximum radius of curvature and a minimum radius of curvature of the nucleus boundary, and comparing the same. For example, a ratio between the maximum diameter and the minimum diameter may be determined, and this ratio could resemble a blood vessel probability indicator. Clearly, there are infinite mathematical ways and algorithm which may process this ratio in the calculation of the blood vessel probability, and the invention is not limited to any specific way. However, according to this embodiment of the invention, the algorithm is at least qualitatively defined in that a more elongate shape leads to a higher blood vessel probability than a round shape.

In a preferred embodiment, the nucleus property is the absence of nuclei at the region or location, wherein said algorithm accounts for the absence of nuclei at said region or location in the determining of the blood vessel probability in such a manner, that absence of nuclei leads to a higher blood vessel probability. The rationale behind this criterion is that the lumen of a blood vessel is "empty", such that the absence of nuclei may indeed be an indication of a blood vessel to be present.

In a preferred embodiment, said nucleus property is the size of the nucleus or nuclei at the region or location, wherein said algorithm accounts for the size of the nucleus/nuclei at the region or location in such a manner that a size of the nucleus/nuclei lying within a predetermined range of sizes leads to an increased blood vessel probability, whereas a size outside said range leads to a reduced blood vessel probability. The predetermined size may e.g. be chosen based on knowledge about typical sizes of endothelial cells. Herein, the term "size" has a broad meaning, and may in particular refer to the area of the nucleus in the two-dimensional image. Again, there are infinite ways the algorithm could account for the size of a nucleus in the calculation of the blood vessel probability, and the invention is not limited to any specific mathematical implementation, as long as the algorithm qualitatively behaves as defined.

In a preferred embodiment, one of said blood vessel probability indicators is based on the presence of residual blood represented in the image, wherein said algorithm accounts for the presence of residual blood in such a manner that a detected presence of residual blood leads to a higher blood vessel probability at the respective region or location. This is an example of a blood vessel indicator that is not related to a nucleus property. The rationale behind this blood vessel probability indicator is that even in the prepared tissue, residual blood may remain in the vessels, that can e.g. be determined in fluorescent images and give a further indication that a blood vessel is present.

In a preferred embodiment, the method comprises a step of segmentation of the image at least with regard to the representation of nuclei, such that each pixel or image cell is associated with a corresponding nucleus or background. In other words, for each pixel or image cell, it is decided whether it belongs to a nucleus, and every part of the image not belonging to a nucleus is by definition "background". The result of the segmentation can be regarded as a black and white image showing nuclei (e.g. white) before a neutral background (e.g. black). Based on this segmentation, the determining of the nucleus properties can be carried out more easily.

A straightforward way of carrying out the segmenting is to assign each pixel or image cell to belong to a nucleus if its intensity exceeds some fixed threshold value, while the remainder of the image is regarded as background. However, in a preferred embodiment, said segmentation step comprises a local adaptive thresholding, wherein a pixel or image cell is associated with a nucleus if its intensity exceeds a local, adaptive threshold associated with said pixel or image cell, wherein said threshold is adapted based on the intensity in the local neighborhood of the respective pixel or image cell.

In a preferred embodiment, the method further comprises a step of smoothening the blood vessel probability distribution or the distribution of individual blood vessel probability indicators using a smoothening filter or a convolution with a smoothening function, in particular a Gaussian filter or a Gaussian smoothening function. Note that this "smoothening" can be regarded as an averaging of blood vessel probabilities at locations close to each other, which means that e.g. high probabilities or confidence values may carry over to their neighborhood, or that isolated low probabilities are increased by their environment. This is a very sensible assumption, which in practice is found to lead to reliable assumed blood vessel locations, because the blood vessel is an object which extends over a large number of pixels or locations, such that isolated regions of pixels of blood vessel probabilities very different from the entire surrounding cannot be expected to resemble the true underlying physiology.

In a preferred embodiment, said blood vessel probability indicators resemble probability values indicating a corresponding likelihood of the presence of a blood vessel at said location or region, and the blood vessel probability at a given location or region within the image is determined by combining, in particular adding the probability values associated with the two or more probability indicators. Herein, it is preferable if a weight with which the individual probability values contribute to the blood vessel probability can be adjusted by user input. For example, the method may comprise outputting a GUI on a display device where the user can adjust the relative weights of the individual probability values, depending on the understanding of the physiology of the tissue under examination.

In a preferred embodiment, said at least two blood vessel probability indicators can be chosen among a set of proposed blood vessel probability indicators by user input. For this purpose, again a GUI may be outputted on a display device where the user can choose among a set of proposed blood vessel probability indicators, for example by clicking corresponding select buttons or the like. Again, the selection of blood vessel probability indicators can be based on the user's understanding of the physiology of the tissue under examination. However, importantly, the method of the invention provides for various options to choose from, thereby permitting the user to make the most use from his or her understanding of the tissue physiology.

In a preferred embodiment, the threshold distance from the assumed blood vessel location is between 30 and 100 µm, preferably between 40 and 75 µm and most preferably between 45 and 55 µm. According to the inventors' understanding, these ranges will generally ensure sufficient perfusion, while at the same time avoiding making the region from which biomarkers can be selected unnecessarily small.

In a preferred embodiment, said automatic evaluating of the selected biomarkers comprises one or more of determining the distance from the assumed vessel location, determining the area of a corresponding nucleus in the image plane, the number of biomarker spots, and the size and/or intensity of foci.

In a preferred embodiment, said image is a immunofluorescence image.

In a preferred embodiment, said biomarker is a biomarker indicating double-strand breaks, in particular γH2AX. However, while this biomarker is referred to both, in the introductory part of the specification as well as in the description of a detailed embodiment below, it is emphasized that the method, computer program and system of the invention are not limited to this but are rather applicable to a large range of biomarkers. Indeed, since blood vessels are the central structures supplying oxygen, nutritions and the like in a tissue, it can be expected that the cellular expression of a plurality of biomarkers is likewise dependent on the distance from the supplying vessel. The method is therefore expected to find use in combination with a large variety of biomarkers in experimental analysis and clinical diagnostics on tissue samples.

A further aspect of the invention relates to a computer-readable storage medium comprising instructions which, when executed by a computer, cause the computer to carry out the following steps:

automatically determining, for a plurality of locations or regions within an image of a tissue sample in which cell nuclei of the tissue as well as biomarkers are represented, a blood vessel probability that represents a probability that the image at the corresponding location or region represents a blood vessel, said automatic determining based on a combination of at least two blood vessel probability indicators, wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location or region, and wherein said automatic determining is based on an algorithm that calculates said blood vessel probability based on said at least two blood vessel probability indicators, automatically determining an assumed blood vessel location within said image based on a distribution of blood vessel probability with respect to said locations or regions within the image, automatically selecting biomarkers represented in said image at locations outside the assumed blood vessel location but within a threshold distance from said assumed blood vessel location, and automatically evaluating the selected biomarkers.

The instructions stored on the computer-readable storage medium may represent a computer program product. In a preferred embodiment, the computer-readable storage medium comprises instructions which, when executed by a computer, cause the computer to carry out the method according to any one of the embodiments described above.

A further aspect of the invention relates to a system for computer-assisted evaluation of biomarkers in a tissue sample, said system comprising an imaging apparatus for generating an image of the tissue sample in which cell nuclei of the tissue as well as biomarkers are represented, and a processor, said processor being configured for automatically determining for a plurality of locations or regions within the image a blood vessel probability that represents a probability that the image at the corresponding location or region represents a blood vessel, said automatic determining based on a combination of at least two blood vessel probability indicators, wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location or region, and wherein said automatic determining is based on an algorithm that calculates said blood vessel probability based on said at least two blood vessel probability indicators, automatically determining an assumed blood vessel location within said image based on a distribution of blood vessel probability with respect to said locations a regions within the image, automatically selecting biomarkers represented in said image at locations outside the assumed blood vessel location but within a threshold distance from said assumed blood vessel location, and automatically evaluating the selected biomarkers.

In a preferred embodiment, the processor of said system is configured for carrying out a method according to one of the embodiments described above.

DESCRIPTION OF THE PREFERRED EMBODIMENT

Figure 1:
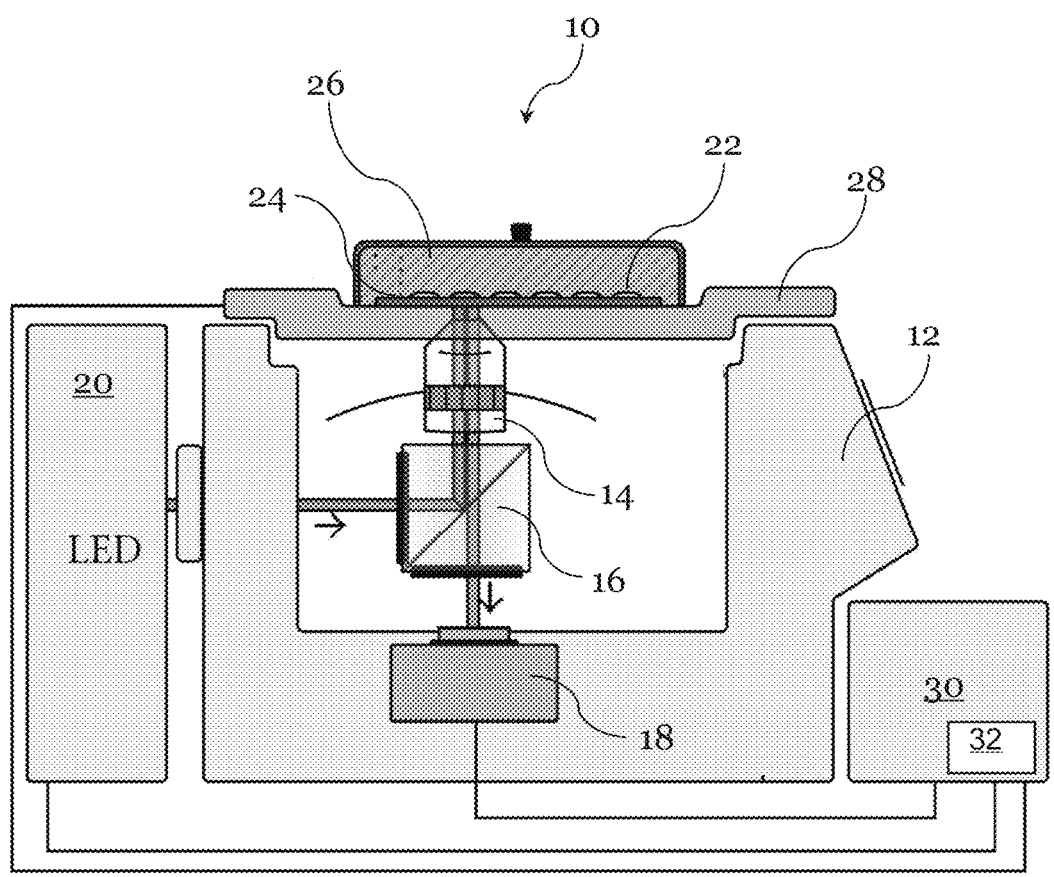
FIG. 1 shows a schematic presentation of a system according to an embodiment of the invention.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

With reference to FIG. 1, a system 10 for carrying out the computer-assisted evaluation of biomarkers in a tissue sample according to various embodiments of the invention is shown. Most of the hardware components of the system 10 shown in FIG. 1 are known in combination from Willitzki et al. "*New Platform Technology for Comprehensive Serological Diagnostics of Autoimmune Diseases*", Clinical and Developmental Immunology, Volume 2012, Article ID 284740, from which FIG. 1 was taken and modified. The system 10 comprises a motorized inverse fluorescence microscope 12 including different objectives 14 and dual band filter sets 16. The microscope 12 further comprises a gray level camera 18 for image acquisition. Fluorescence excitation is achieved by means of LEDs 20. As is further seen from FIG. 1, a tissue sample 22 to be analyzed is provided on a microtiter plate 24 in a darkroom 26, which is arranged on a movable scanning stage 28.

As is further shown in FIG. 1, a computer 30 including a processor 32 is provided and operatively connected with the camera 18, the LEDs 20 and the movable scanning stage 28. On the computer 30, a plurality of software modules are stored, including software modules to control the microscope 12, the automatic focusing of the objectives 14, the selection of filters 16, the camera 18, the LEDs 20, as well as the movable scanning stage 28. By means of the software modules, the microscopy related steps of the method according to various embodiments of the present invention can be carried out On the computer 30, further software code is stored for carrying out the image analysis related steps of the method according to embodiments of the invention on the images recorded by camera 18. On the computer 30, further software modules are stored for automatically determining an assumed blood vessel location within an image recorded by camera 18, for automatically selecting biomarkers which are presented in such image at locations outside the assumed vessel location but within a threshold distance from the assumed blood vessel location, and for automatically evaluating the selected biomarkers. While not shown in the figure, the computer 3o is connected with an output device such as a display for outputting results of the biomarker evolution.

FIGS. 2a) and b) show two color channels of an immunofluorescence image recorded with the system 10 of FIG. 1 on a section of tumor tissue. In immunofluorescence, the specificity of antibodies to their antigens is used to target fluorescent dyes to a specific biomolecule target within a cell. In the embodiment shown, the γH2AX biomarker is used. γH2AX is a histone protein that naturally occurs in the nucleus of all eukaryotes. It has been confirmed that the phosphorylation of γH2AX is a central event of the cellular response to DNA double strand breaking. After immunofluorescence staining, in this case using an Alexa 488 coupled anti-body, the γH2AX becomes visible in the microscope 12 of the system 10 of FIG. 1. Alexa 488 is a fluorescent dye that absorbs at about 495 nm and emits fluorescent light at around 519 nm (green). The corresponding color channel is shown in FIG. 2b), where a plurality of foci can be discerned.

For the same tissue sample, a DAPI fluorescent stain has been used to visualize the nuclei, as shown in FIG. 2a). DAPI can pass through cell membranes and binds strongly to A-T rich regions in the DNA. DAPI has an absorption maximum at 358 nm (ultraviolet) and its emission maximum at 461 nm (blue). The corresponding color channel is shown in FIG. 2a). Strictly speaking, FIGS. 2a) and b) resemble separate but co-registered images, that are recorded with different excitation wavelengths of the LEDs 20 and different settings of the filter 16. However, for the purpose of the present disclosure, the two co-registered images are simply referred to as "an image", in which both, the cell nuclei (by means of the DAPI fluorescence) and the biomarkers (by means of the Alexa 488 fluorescence) are represented.

Of the plurality of biomarker foci represented in FIG. 2b), only those foci shall be evaluated which are located in perfused tumor areas. Namely, as was indicated in the introductory part of the description, the dose-response of γH2AX foci is highly dependent on tumor cell oxygenation, and in order to determine the radiosensitivity of tumors using γH2AX, it is important to restricted evaluation to perfused tumor areas. In the embodiment shown, the diffusion of the tumor tissue is not directly determined. Instead, according to the embodiment of the invention, the location of blood vessels shall be automatically determined in the image, and the evaluation of the γH2AX biomarker shall then be restricted to foci within a predetermined threshold distance from the vessel that would promise sufficient perfusion.

Unfortunately, there is no single criterion by which the blood vessel could be automatically identified with certainty. Instead, the method of the invention pursues a probabilistic approach, in which at every pixel location a "blood vessel probability" is determined that represents the probability that the image at the respective pixel represents a blood vessel. This "blood vessel probability" is in turn determined from a combination of a plurality of "blood vessel probability indicators", which in the preferred embodiment resemble individual probability values indicating a corresponding likelihood of the presence of a blood vessel at said pixel.

More precisely, in a specific embodiment, at every pixel location, the "blood vessel probability" $p_{vessel}$ is defined as a weighted sum of five "blood vessel probability indicators" $p_1(a) \ldots p_5(e)$, where $u_1 \ldots u_5$ are the corresponding weight factors:

$$p_{vessel} = u_1 \cdot p_1(a) + u_2 \cdot p_2(b) + u_3 \cdot p_3(c) + u_4 \cdot p_4(d) - u_5 \cdot p_5(e)$$

Note that calculating the sum is one example of the aforementioned "combining of probability values associated with two or more probability indicators". However, other, possible mathematically more involved ways of combining such probability values are likewise possible. Note further that parameters a, b, c, and e resemble examples of the afore mentioned "nucleus properties", namely a: an "elongateness parameter", which corresponds to the ratio of the largest diameter to the smallest diameter of a nucleus associated with the pixel. For a close to 1, $p_1(a)$ is close to zero, indicating that it is unlikely that at a location with a non-elongate (i.e. round) nucleus, a blood vessel is present. Instead, in the present images, round nuclei are indicative of tumor cells rather than endothelial cells. With increasing elongateness parameter values for a, $p_1(a)$ likewise increases, and reaches e.g. a value of 0.8 at a=2.0 and 1.0 at a=3.0. The distribution of the blood vessel probability parameter $p_1(a)$ derived from the DAPI fluorescence image of FIG. 2a) is shown in FIG. 2e) as a gray scale image, where the highest brightness corresponds to a probability of 1 and black corresponds to a probability of 0. A corresponding line diagram is shown in FIG. 3e).

b: is a parameter resembling the area of the nucleus in the image, or in other words, the size of the nucleus. If the parameter b is within a predetermined range of sizes expected for endothelial cells, then $p_2(b)$ is close to 1, while $p_2(b)$ drops to zero as b moves away from the predetermined range of sizes. In the exemplary embodiment described with reference to FIG. 2 to FIG. 7, the size parameter b has not been used, or in other words, the weighting factor $u_2$ was chosen to be zero.

c: is a parameter resembling an absence of nuclei at the corresponding location. In other words, $p_3(c)=1$ if at the given location, no nucleus is present, which could be an indication of the lumen of a vessel at the respective location, and $p_3(c)=0$ if a nucleus is present. The corresponding probability distribution $p_3(c)$ is shown in FIG. 2c), which can be regarded as the probability distribution of the "empty space". Since the intensity of the DAPI image of FIG. 2a) is indicative for the presence of nuclei, the "empty space" image of FIG. 2c) is essentially the inversion of the DAPI image.

e: is a "roundness parameter", and may generally be the same parameter as the "elongateness parameter a" described above. In other words, $p_5(e)$ is close to 1 if the "roundness parameter" e indicates a round shape, for example a maximum and minimum diameter which are almost equal, and $p_5(e)$ is close to 0, if the "roundness parameter" e indicates e.g. an elongate shape. If at a given location a nucleus of round shape is found, this is an indication that a round tumor cell, and hence no blood vessel is present, which is why $p_5(e)$ is subtracted from rather than added to the "blood vessel probability" $p_{vessel}$. While it would appear at first sight that the nucleus properties "elongateness" and "roundness" describe the same thing and could hence be accounted for on the same footing, treating them differently allows inter alia to choose different weighting factors $u_1$ and $u_5$. Clearly, it is possible that the parameters a and e are the same, but in the most general case, they may be defined independently. In particular, instead of defining the roundness via the ratio of the maximum and minimum diameters, it is possible to define the roundness by a variation of the curvature of the boundary of the corresponding nucleus or the like. The probability distribution $p_5(e)$ is shown in FIG. 2d).

A further blood vessel probability indicator is the presence of residual blood. Blood exhibits fluorescence when excited at a wavelength of about 470 nm, and can hence be seen in the color channel shown in FIG. 2b). The parameter d indicates the presence of residual blood, and residual blood represented in the image leads to a probability value $p_4(d)=1$, whereas at pixels where no residual blood is detected, $p_4(d)=0$. The probability distribution of $p_4(d)$ is shown in FIG. 2f). The presence of residual blood is an example of a "blood vessel probability indicator" that is not based on a property of a nucleus associated with the pixel location.

While not shown in this embodiment, other nucleus properties can be used for defining additional blood vessel probability indicators, in particular the "texture" or the intensity of the nucleus as represented in the image. The "texture" could be the granularity of the nucleus as represented in the image, the presence of a speckled pattern, multiple dots pattern or the like. Examples of "texture" can be seen in FIG. 1 of the article of Willitzki et al. referred to above. The expression "as presented in the image" indicates that reference is made to how the nucleus visualized by the DAPI "looks" in the image, rather than actual physical properties of the true nucleus.

In order to evaluate the nucleus properties as resembled by parameters a, b, c, and e, in a first step, not shown in detail here, the DAPI image of FIG. 2a) is subjected to a segmentation or a binarisation. The idea of the segmentation is to separate the DAPI image into sections resembling nuclei and the "remainder" or background of the image. In other words, for each pixel or image cell, it is decided whether it belongs to a nucleus, and every part of the image not belonging to a nucleus is by definition "background". As explained above, the result of the segmentation can be regarded as a black and white image showing nuclei (e.g. white) before a neutral background (e.g. black). Based on this segmentation, the automatic determining of the nucleus properties can be carried out using image analysis techniques per se known in the art.

As was indicated above, the segmentation step preferably comprises a local adaptive thresholding, wherein a pixel or image cell is associated with a nucleus if its intensity exceeds a local, adaptive threshold associated with said pixel or image cell, wherein said threshold is adapted based on the intensity in the local neighborhood of the respective pixel or image cell. This gives better results than for example global thresholding, where a global threshold is employed for the entire image. For better distinguishing nuclei, in particular those overlapping in the image, a so-called watershed algorithm is employed in the segmentation.

Moreover, each of the individual "blood vessel probability indicators" $p_1(a) \ldots p_5(e)$ can be subjected to a smoothening or averaging operation, for example employing a Gaussian filter. In particular, the individual blood vessel probability indicator distributions can be smoothened by means of a convolution with a smoothening function, a so-called "mollifier", which in the embodiment shown is likewise a Gaussian function. In the alternative, the smoothening or averaging operation can be reserved to the "blood vessel probability" $p_{vessel}$, which is the result of the sum of the weighted blood vessel probability indicators $p_1(a) \ldots p_5(e)$.

Figure 2:
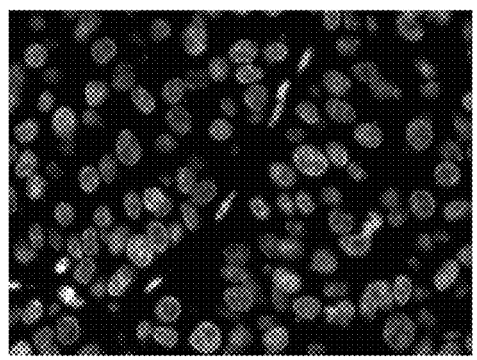
FIG. 2a) shows a first color channel of an image of a tissue sample in which DNA is represented.
FIG. 2b) shows a second color channel of the same image as in FIG. 2a), in which a γH2AX biomarker is represented.
FIG. 2c) is a probability distribution resembling the absence of nuclei in the image of FIG. 2a).
FIG. 2d) is a probability distribution resembling the presence of round cells (tumor cells) in the image of FIG. 2a).
FIG. 2e) is a probability distribution of elongate cells (endothelial cells) in the image of FIG. 2a).
FIG. 2f) is a probability distribution of residual blood in the image of FIG. 2b).
FIG. 2g) is the blood vessel probability distribution derived from the individual probability distributions of the images of FIG. 2c) to FIG. 2f).
Figure 2:
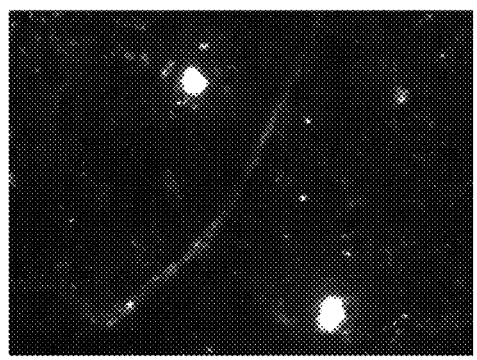
Figure 2:
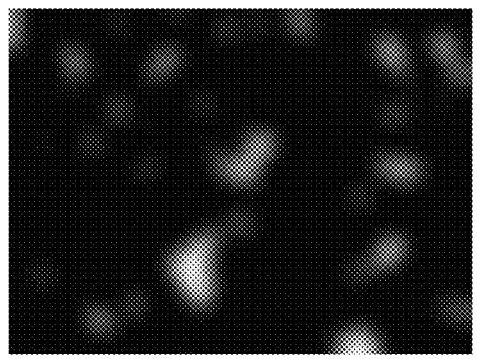
Figure 2:
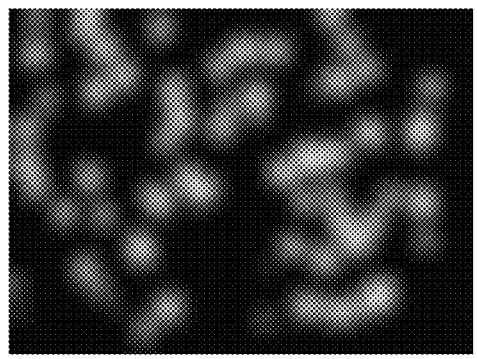
Figure 2:
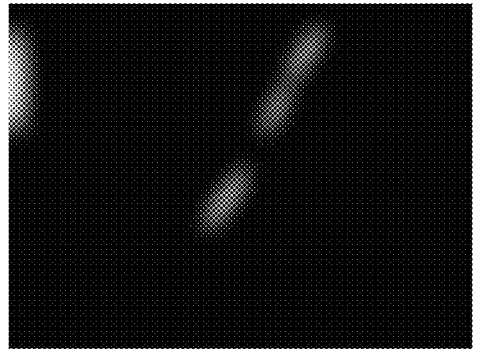
Figure 2:
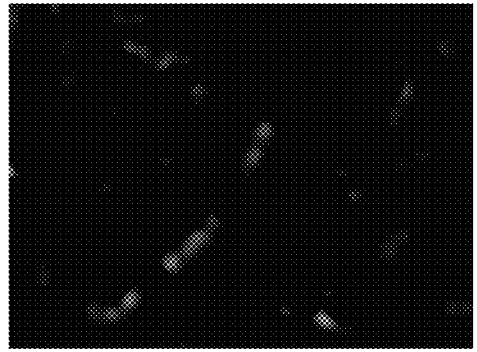
Figure 2:
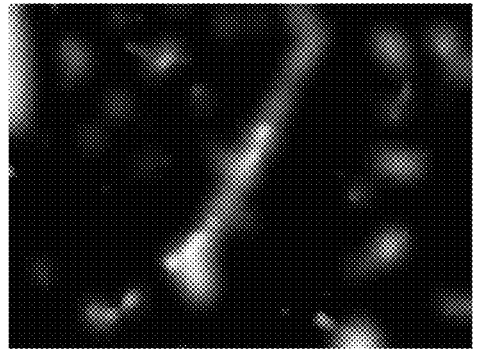
Figure 3:
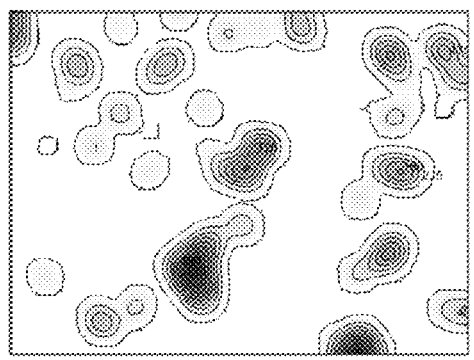
FIG. 3c)-3g) show the same probability distributions as FIG. 2c) to FIG. 2g), but expressed in a contour plot.
Figure 3:
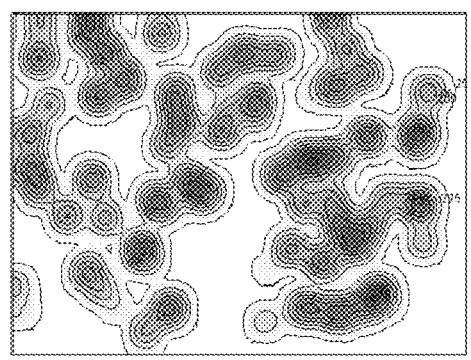
Figure 3:
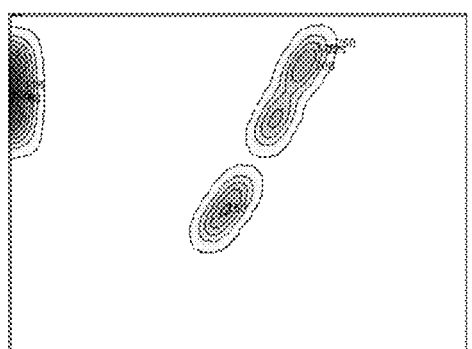
Figure 3:
Figure 3:
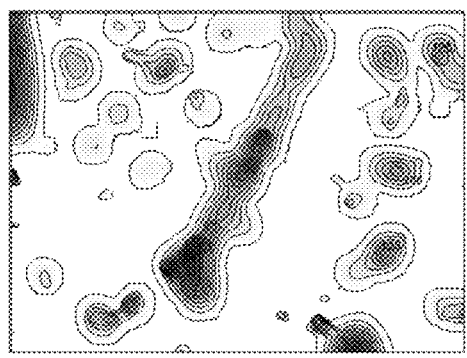
Figure 4:
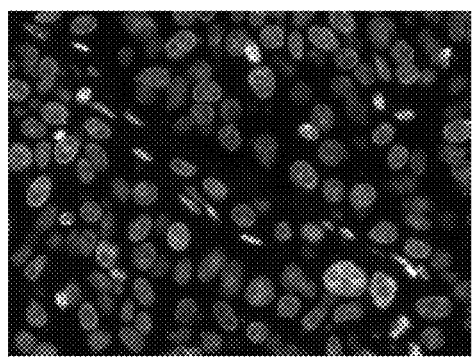
FIG. 4a) shows a first color channel of an image of a further tissue sample in which DNA is represented.
FIG. 4b) shows a second color channel of the same image as in FIG. 4a), in which a γH2AX biomarker is represented.
FIG. 4c) is a probability distribution resembling the absence of nuclei in the image of FIG. 4a).
FIG. 4d) is a probability distribution resembling the presence of round cells (tumor cells) in the image of FIG. 4a).
FIG. 4e) is a probability distribution of elongate cells (endothelial cells) in the image of FIG. 4a).
FIG. 4f) is a probability distribution of residual blood in the image of FIG. 4b).
FIG. 4g) is the blood vessel probability distribution derived from the individual probability distributions of the images of FIG. 4c) to FIG. 4f).
Figure 4:
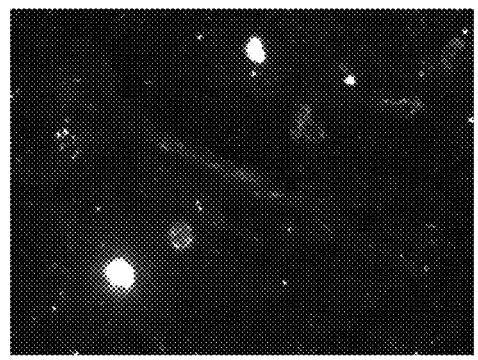
Figure 4:
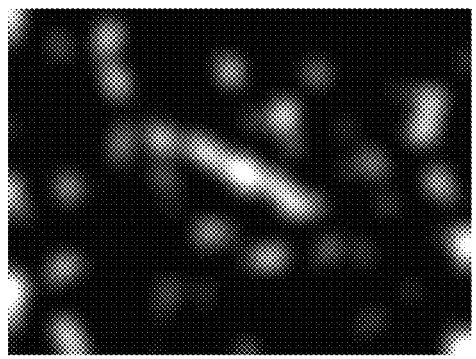
Figure 4:
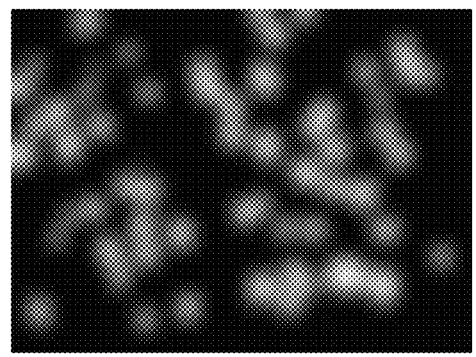
Figure 4:
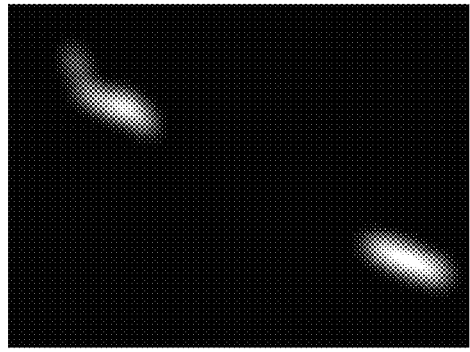
Figure 4:
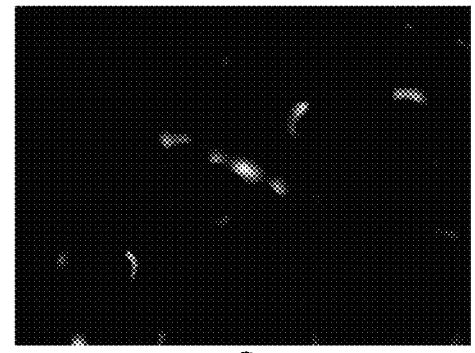
Figure 4:
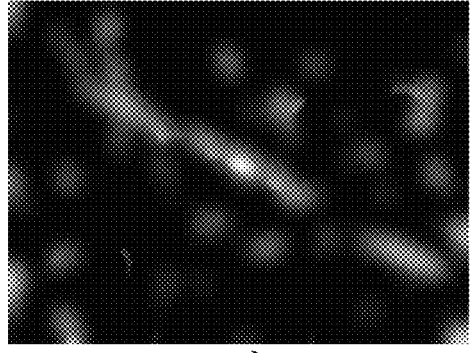

In the embodiment shown in FIGS. 2 to 4, the weighting factors were chosen to be (up to a common normalization factor) Ui=2, u2=o, u3=1, u4=0.5, and u5=1. Using these (relative) weights, the corresponding blood vessel probability is obtained as shown in FIG. 2g for one sample image as a gray scale image, in FIG. 3g in a corresponding contour plot, and for another sample image in FIG. 4g as a gray scale image and in FIG. 5g in a corresponding contour plot. While in the above explanation reference has been made to FIG. 2 a)-g) and FIG. 3 c)-g), it should be noted that the same type of images and probability distributions are shown in FIG. 4 a)-g) and FIG. 5 c)-g), only for a different sample tissue.

Figure 5:
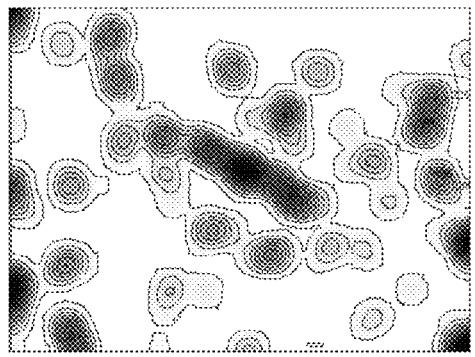
FIG. 5c)-5g) show the same probability distributions as FIG. 4c) to FIG. 4g), but expressed in a contour plot.
Figure 5:
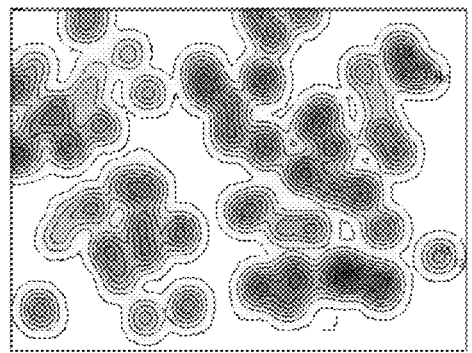
Figure 5:
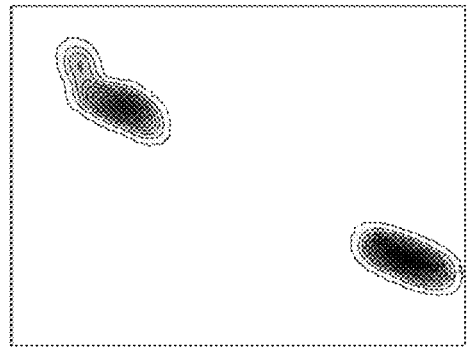
Figure 5:
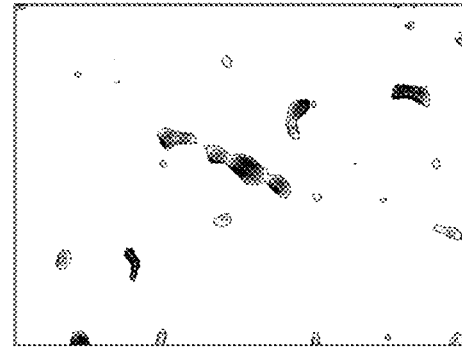
Figure 5:
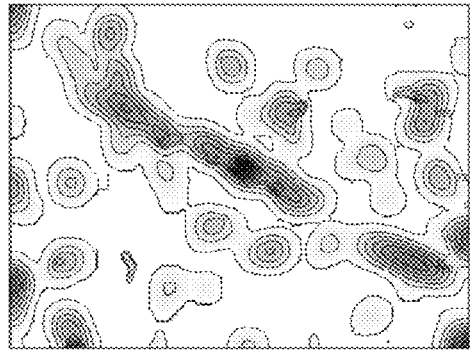
Figure 6:
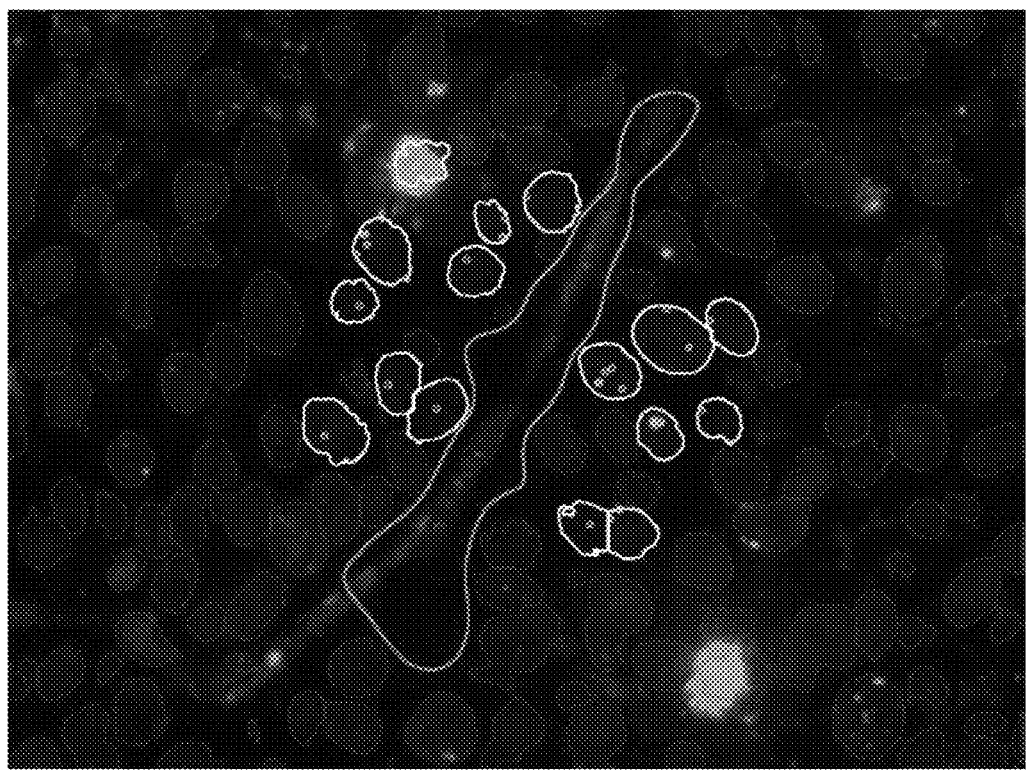
FIG. 6 shows the assumed blood vessel location and the evaluated cells for the image of FIGS. 2a) and b).
Figure 7:
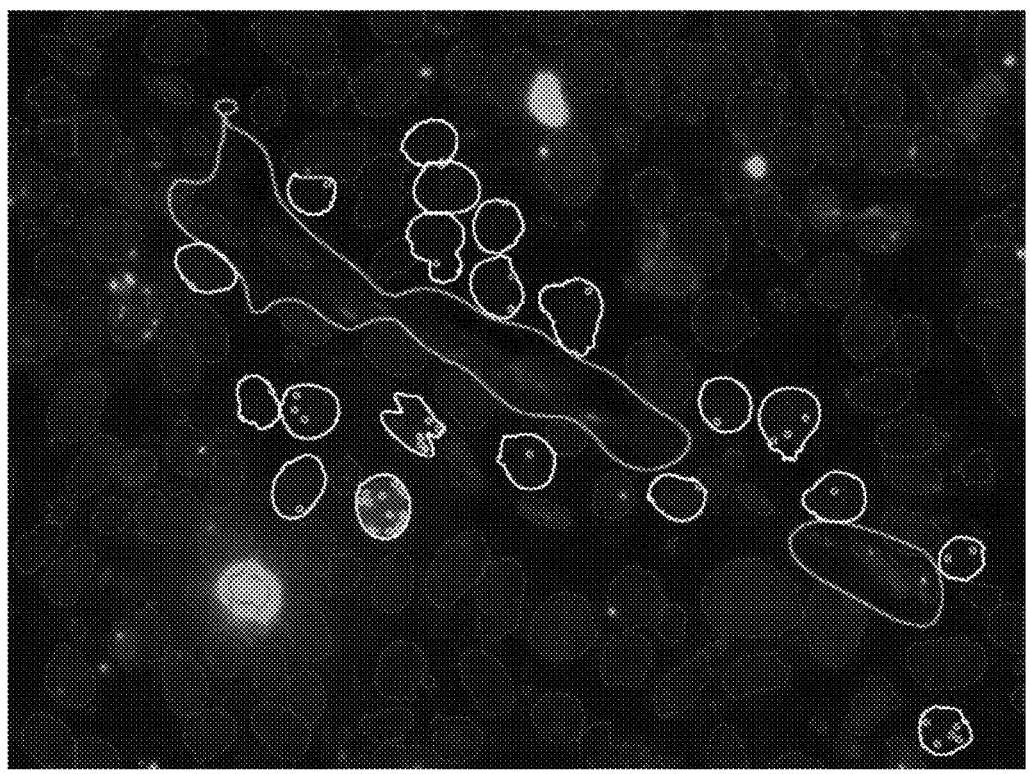
FIG. 7 shows the assumed blood vessel location and the evaluated cells for the image of FIGS. 4a) and b).

As a final step, the "blood vessel probability distribution" needs to be transformed to a "assumed blood vessel location" within the image. In the present embodiment, this is achieved by identifying all pixels for which the "blood vessel probability" exceeds a predetermined threshold to be part of the "assumed blood vessel location". FIG. 6 shows the result for the images of FIGS. 2 and 3, where the assumed blood vessel location is marked by the white boundary. Similarly, the assumed blood vessel location for the images of FIGS. 4 and 5 is shown in FIG. 7. Once the assumed blood vessel location is known, foci within the biomarker image (FIG. 2b, FIG. 4b) in a location outside the assumed vessel location but within a threshold distance from the assumed vessel location can be automatically evaluated. In the shown embodiment, the threshold distance was chosen to be 50 μm. In other words, the maximum distance was chosen to be 50 μm, while the minimum distance from the boundary is 0 μm.

Note that in various embodiments of the invention, the relative weighting factors $u_1$ to $u_5$ can be chosen by user input. For this purpose, a GUI (not shown) providing an input mask for choosing the relative weighting factors can be automatically presented to a user. For example, while in the shown embodiment the highest weighting factor was associated with the "elongateness" of the nuclei, there may be tissue samples where the nuclei of the tumor cells are likewise elongate, such that it would be advisable to not give predominant weight to this characteristic. By presenting the user several possibilities to choose from, the user can resort to his or her knowledge about the tissue properties to make an educated choice. However, at any rate, the assessment of the "blood vessel probability" will be based on at least two "blood vessel probability indicators", of which at least one is based on at least one property of a nucleus or nuclei associated with the corresponding location.

As compared to procedures where the biomarkers of foci are selected manually, the method of the present invention is not only more efficient, but also better reproducible, because the selection of foci is carried out automatically, and is hence not dependent on the practice of the individual user Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

The invention claimed is:

1. A method for computer-assisted evaluation of biomarkers in a tissue sample, comprising the following steps:
   providing an image of the tissue sample in which cell nuclei of the tissue as well as biomarkers are represented,
   automatically determining for a plurality of locations or regions within the image a blood vessel probability that represents a probability that the image at the corresponding location or region represents a blood vessel, said automatic determining based on a combination of at least two blood vessel probability indicators,
      wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location or region, and
      wherein said automatic determining is based on an algorithm that calculates said blood vessel probability based on said at least two blood vessel probability indicators,
   automatically determining an assumed blood vessel location within said image based on a distribution of blood vessel probability with respect to said locations or regions within the image,
   automatically selecting biomarkers represented in said image at locations outside the assumed blood vessel location but within a threshold distance from said assumed blood vessel location, and
   automatically evaluating the selected biomarkers.

2. The method of claim 1, wherein said image comprises a set of co-registered images corresponding to different color channels.

3. The method of claim 1, wherein the image is composed of a plurality of image cells, wherein some or all of the image cells correspond to said regions of said image, or wherein the image is composed of a plurality of pixels, wherein some or all of the pixels correspond to said locations within said image.

4. The method of claim 1, wherein in said automatic determining of the assumed blood vessel location within said image, locations or regions having blood vessel probabilities exceeding a predetermined threshold are assigned to the assumed blood vessel location.

5. The method of claim 1, wherein said nucleus property is the shape of said nucleus, wherein said automatic assessment of the nucleus shape comprises distinguishing between nuclei of round shape and nuclei of elongate shape, and wherein said algorithm accounts for the presence of round or elongate shapes of nuclei in the determining of the blood vessel probability in such a manner, that the presence of round nuclei shapes leads to a lower and the presence of elongate nuclei shapes leads to a higher blood vessel probability.

6. The method of claim 5, wherein said distinguishing between nuclei of round shape and nuclei of elongate shape comprises determining, in the image of the tissue sample, a maximum diameter and a minimum diameter of the respective nucleus, or a maximum radius of curvature and a minimum radius of curvature of the nucleus boundary, and comparing the same.

7. The method of claim 1, wherein said nucleus property is the absence of nuclei at the region or location, wherein said algorithm accounts for the absence of nuclei at said region or location in the determining of the blood vessel probability in such a manner, that absence of nuclei leads to a higher blood vessel probability.

8. The method of claim 1, wherein said nucleus property is the size of the nucleus or nuclei at the region or location, wherein said algorithm accounts for the size of the nucleus/nuclei at the region or location in such a manner that a size of the nucleus/nuclei lying within a predetermined range of sizes leads to an increased blood vessel probability, whereas a size outside said range leads to a reduced blood vessel probability.

9. The method of claim 1, wherein one of said blood vessel probability indicators is based on the presence of residual blood represented in the image, wherein said algorithm accounts for the presence of residual blood in such a manner that a detected presence of residual blood leads to a higher blood vessel probability at the respective region or location.

10. The method of claim 1, further comprising a step of segmentation of the image at least with regard to the representation of nuclei, such that each pixel or image cell is associated with a corresponding nucleus or background.

11. The method of claim 10, wherein said segmentation step comprises a local adaptive thresholding, wherein a pixel or image cell is associated with a nucleus if its intensity exceeds a local, adaptive threshold associated with said pixel or image cell, wherein said local adaptive threshold is adapted based on the intensity in the local neighborhood of the respective pixel or image cell.

12. The method of claim 1, further comprising a step of smoothening the blood vessel probability distribution or the distribution of individual blood vessel probability indicators using a smoothening filter or a convolution with a smoothening function, in particular a Gaussian filter or a Gaussian smoothening function.

13. The method of claim 1, wherein said blood vessel probability indicators resemble probability values indicating a corresponding likelihood of the presence of a blood vessel at said location or region, and wherein the blood vessel probability at a given location or region within the image is determined by combining, in particular adding the probability values associated with the two or more probability indicators.

14. The method of claim 13, wherein a weight with which the individual probability values contribute to the blood vessel probability can be adjusted by user input.

15. The method of claim 1, wherein said at least two blood vessel probability indicators can be chosen among a set of proposed blood vessel probability indicators by user input.

16. The method of claim 1, wherein the threshold distance from the assumed blood vessel location is between 30 and 100 μm.

17. The method of claim 1, wherein said automatic evaluating of the selected biomarkers comprises one or more of determining the distance from the assumed vessel location, determining the area of a corresponding nucleus in the image plane, the number of biomarker spots, and the size and/or intensity of foci.

18. The method of claim 1, wherein said image is an immunofluorescence image.

19. The method of claim 1, wherein said biomarker is a biomarker indicating DNA double-strand breaks, in particular γH2AX.

20. The method of claim 1, wherein the threshold distance from the assumed blood vessel location is between 40 and 75 μm.

21. A computer-readable storage medium comprising instructions which, when executed by a computer, cause the computer to carry out the following steps:
automatically determining, for a plurality of locations or regions within an image of a tissue sample in which cell nuclei of the tissue as well as biomarkers are represented, a blood vessel probability that represents a probability that the image at the corresponding location or region represents a blood vessel, said automatic determining based on a combination of at least two blood vessel probability indicators,
wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location or region, and
wherein said automatic determining is based on an algorithm that calculates said blood vessel probability based on said at least two blood vessel probability indicators,
automatically determining an assumed blood vessel location within said image based on a distribution of blood vessel probability with respect to said locations or regions within the image,
automatically selecting biomarkers represented in said image at locations outside the assumed blood vessel location but within a threshold distance from said assumed blood vessel location, and
automatically evaluating the selected biomarkers.

22. A system for computer-assisted evaluation of biomarkers in a tissue sample, comprising an imaging apparatus for generating an image of the tissue sample in which cell nuclei of the tissue as well as biomarkers are represented, and a processor, said processor being configured for automatically determining for a plurality of locations or regions within the image a blood vessel probability that represents a probability that the image at the corresponding location or region represents a blood vessel, said automatic determining based on a combination of at least two blood vessel probability indicators, wherein at least one of the at least two blood vessel probability indicators is based on an automatic assessment of at least one property of a nucleus or nuclei associated with said location or region within the image, said nucleus property selected from a group consisting of the shape, the texture, the size, the intensity of the nucleus or nuclei associated with the respective location or region as represented in said image, and the absence of nuclei at said location or region, and wherein said automatic determining is based on an algorithm that calculates said blood vessel probability based on said at least two blood vessel probability indicators, automatically determining an assumed blood vessel location within said image based on a distribution of blood vessel probability with respect to said locations or regions within the image, automatically selecting biomarkers represented in said image at locations outside the assumed vessel location but within a threshold distance from said assumed blood vessel location, and automatically evaluating the selected biomarkers.

* * * * *